(12) United States Patent
Akiyama

(10) Patent No.: US 9,429,831 B2
(45) Date of Patent: Aug. 30, 2016

(54) LIGHTING DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 138 days.

(21) Appl. No.: 14/548,678

(22) Filed: Nov. 20, 2014

(65) Prior Publication Data

US 2015/0153020 A1    Jun. 4, 2015

(30) Foreign Application Priority Data

Dec. 2, 2013  (JP) ................................. 2013-249458

(51) Int. Cl.
*G03B 21/20* (2006.01)
*H04N 9/31* (2006.01)

(52) U.S. Cl.
CPC ......... *G03B 21/2073* (2013.01); *G03B 21/204* (2013.01); *H04N 9/3158* (2013.01); *H04N 9/3161* (2013.01); *H04N 9/3182* (2013.01); *H04N 9/3194* (2013.01)

(58) Field of Classification Search
CPC  G03B 21/204; G03B 21/2033; G03B 21/20; G03B 21/2073; H04N 9/31; H04N 9/315; H04N 9/3161; H04N 9/3158; H04N 9/3194; H04N 9/3182; F21Y 2101/02; F21Y 2101/025
USPC ......................................................... 362/260
See application file for complete search history.

(56) References Cited

U.S. PATENT DOCUMENTS 8,733,940 B2    5/2014  Tanaka et al.
2012/0140183 A1*  6/2012  Tanaka ................... G03B 21/28
                                                    353/20

FOREIGN PATENT DOCUMENTS

JP    A-2012-137744    7/2012

* cited by examiner

*Primary Examiner* — William C Dowling
*Assistant Examiner* — Ryan Howard
(74) *Attorney, Agent, or Firm* — Oliff PLC

(57) ABSTRACT

In a lighting device, light in a first wavelength range which is output from a light emitting element passes through a first phase difference plate, and is separated into a first light flux and a second light flux by a polarization separation element. A wavelength conversion unit converts the first light flux to a third light flux. An optical element converts the second light flux into a fourth light flux. A first color combining element combines the third light flux with the fourth light flux. A first control unit changes a direction of an optical axis of the first phase difference plate according to an intensity of the third light flux and an intensity of the fourth light flux.

12 Claims, 10 Drawing Sheets

LIGHTING DEVICE AND PROJECTOR

BACKGROUND

1. Technical Field

The present invention relates to a lighting device and a projector.

2. Related Art

A light source device in which a fluorescent substance is excited by light which is output from a plurality of solid light sources, and fluorescence which is emitted from the excited fluorescent substance is used, and a projection type display device using the light source device are disclosed in the following JP-A-2012-137744. In the light source device, output light from the solid light source unit is separated by a polarization separation mirror, one of the separated light beams is guided to a fluorescent light emitting plate as excitation light, and the other of the separated light beams is combined with fluorescence, which is obtained from the fluorescent light emitting plate, to be illumination light. In addition, a rotatable phase difference plate is provided on an optical path between the solid light source unit and the polarization separation mirror.

It is described in JP-A-2012-137744 that "Since it is possible to control light to be input to a fluorescent light emitting plate by adjusting a rotation angle of a phase difference plate, a ratio of light intensity of blue light to yellow light can be controlled. In this manner, it is possible to correct a deviation in white balance which is caused by mismatch in an optical system of a projection type display device, unevenness in output light from a solid light source unit, unevenness in fluorescence convergence efficiency of a fluorescent light emitting plate, or the like.". However, with this configuration, it is not possible to correct the deviation in white balance any time, which is caused by a deterioration with time during use, even though deviation in white balance can be corrected before shipping the product. In addition, it is not possible to correct deviation in color balance of colored light other than white light.

SUMMARY

An advantage of some aspects of the invention is to provide a lighting device in which a change of color balance caused by a deterioration with time during use can be adjusted. In addition, an aspect of the invention is to provide a projector which includes such a lighting device.

An aspect of the invention is directed to a lighting device which includes a light emitting element which outputs light in a first wavelength range; a first phase difference plate to which the light output from the light emitting element is input; a first polarization separation element which separates the light from the first phase difference plate into a first light flux in a first polarization state and a second light flux in a second polarization state; a wavelength conversion unit which includes a first fluorescent substance layer which is excited by the light in the first wavelength range, and converts the first light flux into a third light flux in a second wavelength range which is different from the first wavelength range; an optical element which converts the second light flux into a fourth light flux; a first color combining element which combines the third light flux with the fourth light flux; a first detection unit which detects an intensity of the third light flux and an intensity of the fourth light flux; and a first control unit which changes a direction of an optical axis of the first phase difference plate according to a detection result which is obtained by the first detection unit.

In the lighting device of the aspect of the invention, combined light of the third light flux and the fourth light flux which is combined by the first color combining element is used in illumination. For example, it is assumed that an intensity of light which is output from a light emitting element decreases due to a deterioration with time during use. At this time, when an intensity of the first light flux which is input to the wavelength conversion unit decreases along with the decrease in the light intensity of the light emitting element, a conversion efficiency of a first fluorescent substance layer changes, and a ratio of the intensity of the third light flux to the intensity of the fourth light flux changes. As a result, there is a problem that a color balance changes compared to the color balance before the deterioration with time.

The lighting device according to the aspect of the invention includes the first detection unit which detects the intensity of the third light flux and the intensity of the fourth light flux, and the first control unit which changes the direction of the optical axis of the first phase difference plate according to a detection result of the first detection unit. For this reason, it is possible to ascertain a change in color balance by detecting the intensity of the third light flux and the intensity of the fourth light flux using the first detection unit. When the color balance changes, the ratio of the first light flux in the first polarization state to the second light flux in the second polarization state is adjusted by changing the direction of the optical axis of the first phase difference plate. In this manner, adjusting the intensity of the third light flux obtained from the first light flux and the intensity of the fourth light flux obtained from the second light flux makes it possible to adjust a color balance of light which is output from the lighting device.

In the lighting device according to the aspect of the invention, the first control unit may change the direction of the optical axis of the first phase difference plate so that a ratio of the intensity of the third light flux to the intensity of the fourth light flux gets closer to a reference value.

According to the configuration, it is possible to perform adjusting of a color balance so that a color of illumination light which is obtained from the lighting device gets closer to a reference color.

In the lighting device according to the aspect of the invention, the reference value may be determined based on an initial intensity of the third light flux and an initial intensity of the fourth light flux which are measured by the first detection unit.

According to the configuration, it is possible to adjust a color balance in such a manner that the color balance gets closer to a color of illumination light in an initial state of an individual lighting device, not to a color of illumination light as a design value.

The lighting device according to the aspect of the invention may further include a superposition optical system which includes a first lens array, a second lens array, and a superposition lens, and a mirror which is arranged on an optical path of light flux which is output from one lens among a plurality of lenses provided in the second lens array, and between the second lens array and the superposition lens, in which light reflected by the mirror may be input to the first detection unit.

According to the configuration, a portion of light beams can be separated from the light beams by the mirror before the light beams are input to the superposition lens, and the separated portion is guided to the first detection unit by the mirror. Thus, it is possible to detect the intensity of the third light flux and the intensity of the fourth light flux with high accuracy. As a result, it is possible to adjust a color balance with high accuracy.

In the lighting device according to the aspect of the invention, the mirror may be arranged at a position at which a secondary light source image of the light which is output from the light emitting element is formed.

According to the configuration, uneven illuminance does not occur in a region which is illuminated, even when a part of light beams is separated by arranging the mirror on the optical path.

In the lighting device according to the aspect of the invention, the first fluorescent substance layer may output a fifth light flux in a third wavelength range which is different from both of the first wavelength range and the second wavelength range, and the wavelength conversion unit may include a second fluorescent substance layer which is excited by the light in the first wavelength range, and outputs sixth light flux in a fourth wavelength range which is different from any of the first to third wavelength ranges; a second phase difference plate to which the first light flux is input; a second polarization separation element which separates light which is output from the second phase difference plate into a polarized component which is input to the first fluorescent substance layer, and a polarized component which is input to the second fluorescent substance layer; a second color combining element which generates the third light flux by combining the fifth light flux and the sixth light flux; a second detection unit which detects an intensity of the fifth light flux and an intensity of the sixth light flux; and a second control unit which changes a direction of an optical axis of the second phase difference plate according to a detection result which is obtained by the second detection unit.

The lighting device according to the aspect includes the second detection unit which detects the intensity of the fifth light flux and the intensity of the sixth light flux, and the second control unit which changes the direction of the optical axis of the second phase difference plate according to the detection result obtained by the second detection unit. For this reason, it is possible to ascertain a change in color balance of combined light of the fifth light flux and the sixth light flux by detecting the intensity of the fifth light flux and the intensity of the sixth light flux using the second detection unit. When the color balance changes, a ratio of a polarized component which is input to the first fluorescent substance layer to a polarized component which is input to the second fluorescent substance layer is adjusted by changing the direction of the optical axis of the second phase difference plate. In this manner, it is possible to adjust the intensity of the fifth light flux which is generated by the first fluorescent substance layer, and the intensity of the sixth light flux which is generated by the second fluorescent substance layer, and to adjust the color balance. In addition, adjusting the intensity of the third light flux, which is combined light of the fifth light flux and sixth light flux, and the intensity of the fourth light flux, which is obtained from the second light flux, by the first control unit makes it possible to adjust a color balance of light which is output from the lighting device.

Another aspect of the invention is directed to a projector that includes the lighting device according to the aspect of the invention, an optical modulation unit that modulates light, which is output from the lighting device, according to image information, and a projection optical system that projects the light modulated by the optical modulation unit.

Since the projector according to the aspect includes the lighting device according to the aspect of the invention, it is possible to provide a projector of which a display quality is excellent.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described using FIGS. 1 to 5.

A projector according to the first embodiment is an example of a liquid crystal projector which includes a lighting device which is one embodiment of the invention, and three optical modulation units.

Hereinafter, description will be given in detail using drawings; however, in order to make each constituent element easy to view in the following figure, there is a case in which a scale of a dimension is differently denoted depending on a constituent element.

Figure 1:
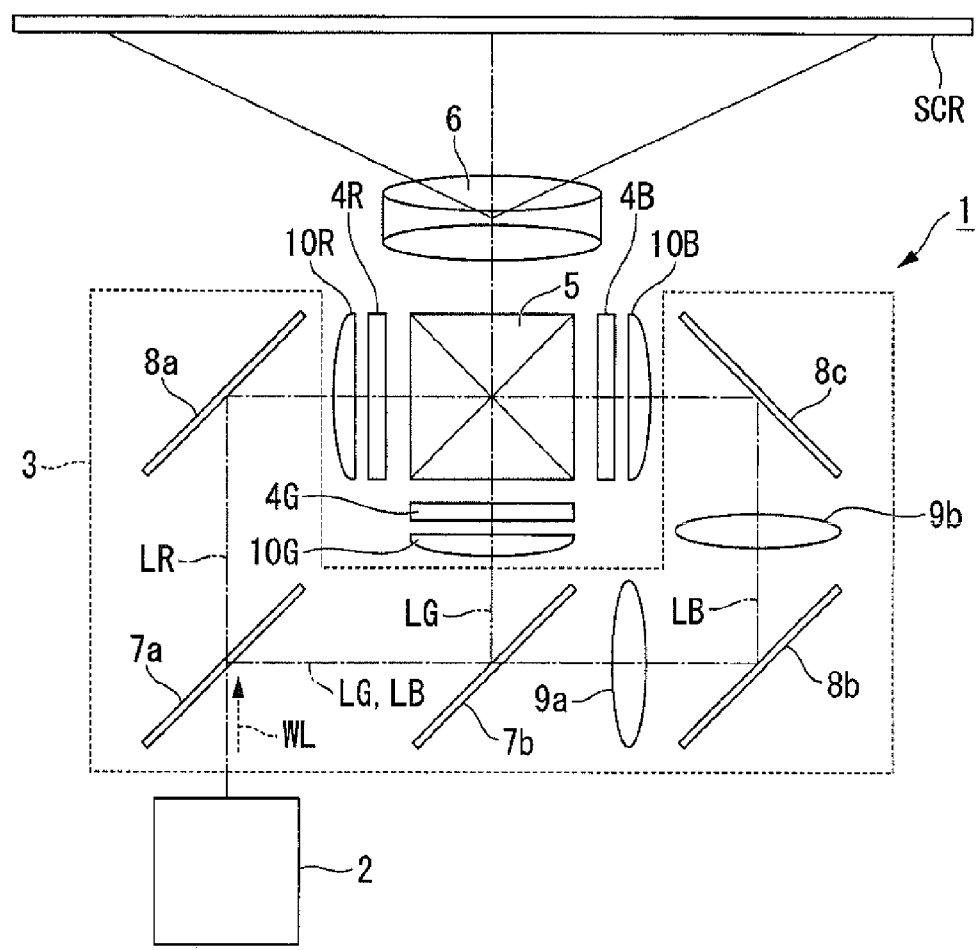
FIG. 1 is a schematic configuration diagram which illustrates a projector according to a first embodiment of the invention.

As illustrated in FIG. 1, a projector 1 according to the embodiment is a projection type image display device which displays a color image on a screen SCR. The projector 1 uses three optical modulation units corresponding to each color of light of red light LR, green light LG, and blue light LB. The projector 1 is equipped with a semiconductor laser that provides light with high luminance and a high output as a light source of a lighting device 2. The projector 1 generally includes the lighting device 2, a color separation optical system 3, a red light optical modulation unit 4R, a green light optical modulation unit 4G, a blue light optical modulation unit 4B, a combining optical system 5, and a projection optical system 6.

The lighting device 2 outputs illumination light WL with a uniform illuminance distribution toward the color separation optical system 3. A lighting device which is one embodiment of the invention which will be described later is used in the lighting device 2.

The color separation optical system 3 separates the illumination light WL which is output from the lighting device 2 into red light LR, green light LG, and blue light LB. The color separation optical system 3 includes a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a has a function of separating the illumination light WL which is output from the lighting device 2 into red light LR, green light LG, and blue light LB. The first dichroic mirror 7a transmits the red light LR, and reflects the green light LG, and the blue light LB. The second dichroic mirror 7b has a function of separating light which is reflected on the first dichroic mirror 7a into green light LG and blue light LB. The second dichroic mirror 7b reflects the green light LG, and transmits the blue light LB.

The first reflecting mirror 8a is arranged on an optical path of the red light LR. The red light LR which penetrated the first dichroic mirror 7a is reflected by the first reflecting mirror 8a toward the red light optical modulation unit 4R. The second reflecting mirror 8b and the third reflecting mirror 8c are arranged on an optical path of the blue light LB. The blue light LB which penetrated the second dichroic mirror 7b is reflected by the second reflecting mirror 8b and the third reflecting mirror 8c toward the blue light optical modulation unit 4B. The green light LG is reflected on the second dichroic mirror 7b, and proceeds toward the green light optical modulation unit 4G.

The first relay lens 9a and the second relay lens 9b are arranged on a light output side of the second dichroic mirror 7b on the optical path of the blue light LB. The first relay lens 9a and the second relay lens 9b have a function of compensating for a light loss of the blue light LB which is caused when the optical path length of the blue light LB is set to be longer than that of the red light LR, or that of the green light LG.

The red light optical modulation unit 4R modulates the red light LR according to image information, and forms image light corresponding to the red light LR. The green light optical modulation unit 4G modulates the green light LG according to image information, and forms image light corresponding to the green light LG. The blue light optical modulation unit 4B modulates the blue light LB according to image information, and forms image light corresponding to the blue light LB.

In the red light optical modulation unit 4R, the green light optical modulation unit 4G, and the blue light optical modulation unit 4B, a transmission type liquid crystal panel is used, for example. In addition, a pair of polarizing plates (not illustrated) is arranged on the input side and the output side of the liquid crystal panel. The pair of polarizing plates transmits linearly polarized light of a specific direction.

A field lens 10R is arranged on the input side of the red light optical modulation unit 4R. A field lens 10G is arranged on the input side of the green light optical modulation unit 4G. A field lens 10B is arranged on the input side of the blue light optical modulation unit 4B. The field lens 10R collimates the red light LR to be input to the red light optical modulation unit 4R. The field lens 10G collimates the green light LG to be input to the green light optical modulation unit 4G. The field lens 10B collimates the blue light LB to be input to the blue light optical modulation unit 4B.

The combining optical system 5 combines image light corresponding to the respective red light LR, green light LG, and the blue light LB, and outputs the combined image light toward the projection optical system 6. In the combining optical system 5, for example, a cross dichroic prism is used.

The projection optical system 6 is configured of a projection lens group which includes a plurality of projection lenses. The projection optical system 6 magnifies and projects the image light which is combined by the combining optical system 5 onto the screen SCR. In this manner, a magnified color image is displayed on the screen SCR.

Hereinafter, the lighting device 2 will be described.

Figure 2:
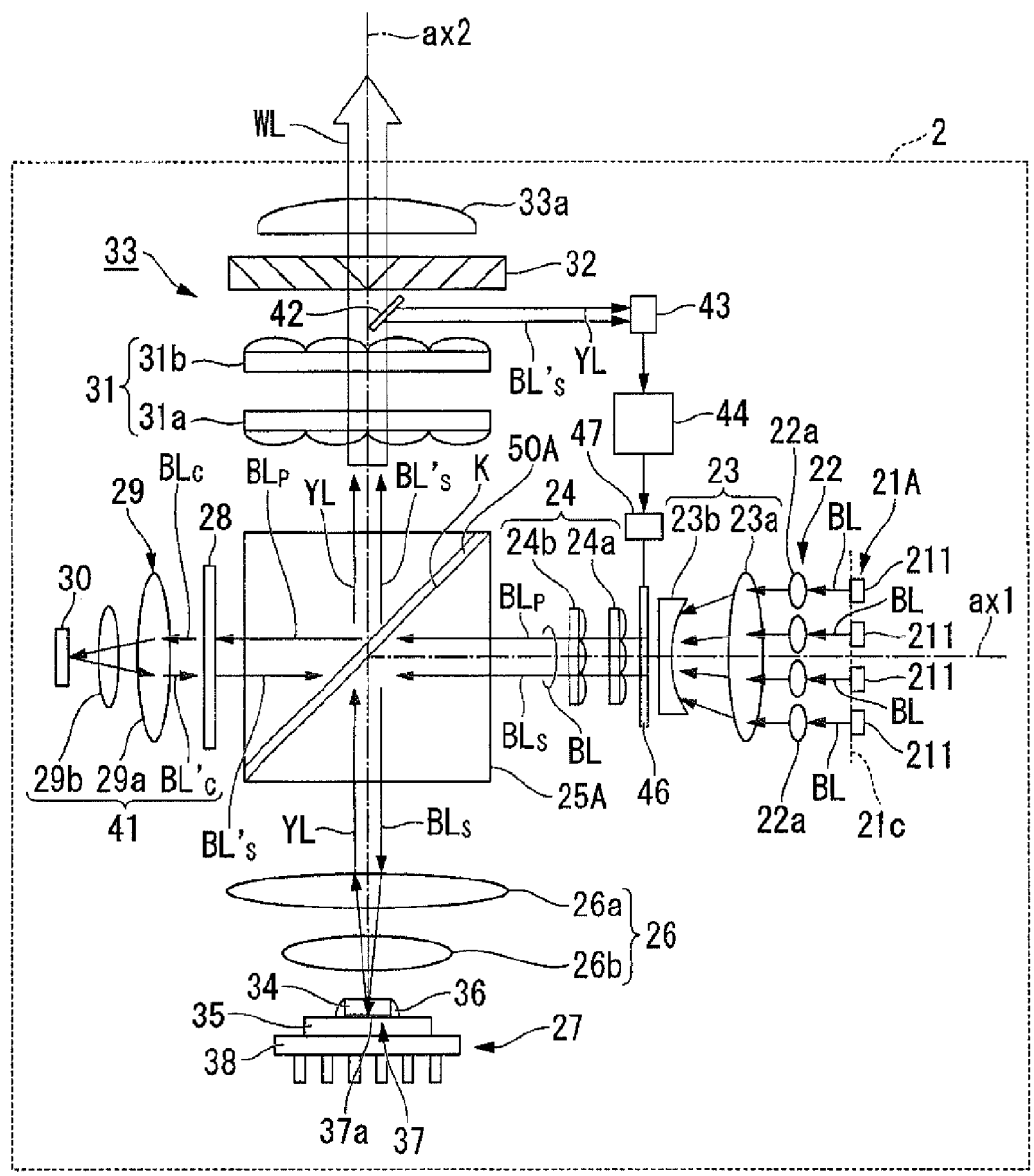
FIG. 2 is a schematic configuration diagram which illustrates a lighting device according to the first embodiment of the invention.

As illustrated in FIG. 2, the lighting device 2 is configured of an array light source 21A, a collimator optical system 22, an afocal optical system 23, a first phase difference plate 46, a first motor 47, a homogenizer optical system 24, a first prism 25A including a first polarization separation element 50A, a first pickup optical system 26, a first light emitting element 27, an optical element 41, a polarizing conversion element 32, a superposition optical system 33, a first light intensity monitoring mirror 42, a first sensor unit 43, and a first control unit 44. The first light emitting element 27 configures a wavelength conversion unit in the invention.

In the above described constituent elements, the array light source 21A, the collimator optical system 22, the afocal optical system 23, the homogenizer optical system 24, the first prism 25A, a phase difference plate 28, a second pickup optical system 29, and a diffusive reflection element 30 are sequentially arranged in this order on an optical axis ax1 in a state in which respective optical centers thereof are aligned with the optical axis ax1 which is illustrated in FIG. 2. On the other hand, the first light emitting element 27, the first pickup optical system 26, the first prism 25A, an integrator optical system 31, the polarizing conversion element 32, and a superposition lens 33a are sequentially arranged in this order on an optical axis ax2 in a state in which respective optical centers thereof are aligned with the optical axis ax2 which is illustrated in FIG. 2. The optical axes ax1 and ax2 are in a positional relationship of being on the same plane, and being orthogonal to each other.

The array light source 21A includes a plurality of semiconductor lasers 211. The plurality of semiconductor lasers 211 are arranged in an array form in a plane 21c which is orthogonal to the optical axis ax1. The number of the semiconductor lasers 211 is not particularly limited. The semiconductor laser 211 according to the embodiment corresponds to a light emitting element in the appended claims.

The semiconductor laser 211 outputs S-polarized blue light of which a peak wavelength is 446 nm, for example. The S-polarized blue light BL is output toward the collimator optical system 22 from the array light source 21A. The blue light BL with the peak wavelength of 446 nm according to the embodiment corresponds to light in the first wavelength range in the appended claims.

The blue light BL which is output from the array light source 21A is input to the collimator optical system 22. The collimator optical system 22 converts the blue light BL which is output from the array light source 21A into a parallel light flux. The collimator optical system 22 is configured of a plurality of collimator lenses 22a which are arranged in an array form, for example. The plurality of collimator lenses 22a are respectively arranged corresponding to the plurality of semiconductor lasers 211.

The blue light BL which is converted into a parallel light flux by passing through the collimator optical system 22 is input to the afocal optical system 23. The afocal optical system 23 adjusts a diameter of the light flux of the blue light BL. The afocal optical system 23 is configured of an afocal lens 23a and an afocal lens 23b, for example.

The blue light BL of which the diameter of the light flux is adjusted by passing through the afocal optical system is input to the homogenizer optical system 24. The homogenizer optical system 24 converts a light intensity distribution of the blue light BL into a uniform light intensity distribution which is referred to as a top hat type distribution, for example. The homogenizer optical system 24 is configured of a multi lens array 24a and a multi lens array 24b, for example.

The first phase difference plate 46 is arranged between the afocal optical system 23 and the homogenizer optical system 24, more specifically, on an optical path between the afocal lens 23b and the multi array lens 24a. The first phase difference plate 46 is provided so as to be rotatable in the face thereof that the blue light BL enters. The first phase difference plate 46 is configured of a half-wave plate with respect to the wavelength 446 nm of the blue light BL. An optical axis of the first phase difference plate 46 intersects a polarizing axis of the blue light BL which is input to the first phase difference plate 46. The optical axis of the first phase difference plate 46 may be either a fast axis or a slow axis of the first phase difference plate 46.

The blue light BL is coherent S-polarized light. The blue light BL is originally S-polarized light; however, since a polarizing axis of the blue light BL intersects the optical axis of the first phase difference plate 46, a part of the S-polarized light is converted into P-polarized light when the blue light BL penetrates the first phase difference plate 46. As a result, the blue light BL which penetrated the first phase difference plate 46 becomes light in which an S-polarized component BLs and a P-polarized component BLp are mixed at a predetermined ratio. For example, the S-polarized component BLs according to the embodiment corresponds to the first light flux in a first polarized state in the appended claims, and the P-polarized component BLp according to the embodiment corresponds to the second light flux in a second polarized state in the appended claims.

The first motor 47 for rotating the first phase difference plate 46 is connected to the first phase difference plate 46. A rotation mechanism of the first phase difference plate 46 will be described later.

The blue light BL which is output from the homogenizer optical system 24 is input to the first prism 25A. The first prism 25A is configured of a dichroic prism which has wavelength selectivity, for example. The dichroic prism has an inclined plane K which forms an angle of 45° with respect to the optical axis ax1. The inclined plane K also forms an angle of 45° with respect to the optical axis ax2. The first prism 25A is arranged so that an intersection point of the optical axes ax1 and ax2 which are orthogonal to each other and an optical center of the inclined plane K align with each other. A parallel plate-shaped dichroic mirror may be used instead of the first prism 25A which is configured of the dichroic prism.

The first polarization separation element 50A which has wavelength selectivity is provided on the inclined plane K. The first polarization separation element 50A has a polarization separation function of separating the blue light BL into the S-polarized component BLs and the P-polarized component BLp with respect to the first polarization separation element 50A. Specifically, the first polarization separation element 50A reflects the S-polarized component BLs of the blue light BL, and transmits the P-polarized component BLp of the blue light BL. In the following description, since the S-polarized component BLs which is reflected in the first polarization separation element 50A is used in excitation of a fluorescent substance layer, this component is referred to as excitation light BLs. Since the P-polarized component BLp which penetrates the first polarization separation element 50A is used as illumination light, this component is referred to as blue light BLp.

In addition, the first polarization separation element 50A has a function of color separation in which yellow fluorescence light YL of which a wavelength range is different from that of the blue light BL which is output from the semiconductor laser 211 is transmitted regardless of a polarized state of the fluorescence light YL.

The S-polarized excitation light BLs coming from the first polarization separation element 50A is input to the first pickup optical system 26. The first pickup optical system 26 condenses the excitation light BLs toward the first fluorescent substance layer 34 of the first light emitting element 27. The first pickup optical system 26 is configured of a pickup lens 26a and a pickup lens 26b, for example.

The excitation light BLs coming from the first pickup optical system 26 is input to the first light emitting element 27. The first light emitting element 27 includes the first fluorescent substance layer 34 and a substrate 35 which supports the first fluorescent substance layer 34. The fluorescent substance included in the first fluorescent substance layer 34 is excited when the excitation light BLs is input to the first fluorescent substance layer 34, and the yellow fluorescence light YL of which a wavelength is different from that of the excitation light BLs is generated. The fluorescence light YL according to the embodiment corresponds to the third light flux in the second wavelength range in the appended claims.

In the first light emitting element 27, the first fluorescent substance layer 34 is fixed to the substrate 35 using an adhesive 36 which is provided between a side face of the first fluorescent substance layer 34 and the substrate 35, in a state in which a face on the side opposite to the side that the excitation light BLs enters is in contact with the substrate 35. A heat sink 38 for dissipating heat of the first fluorescent substance layer 34 is provided on the face of the substrate 35, specifically, the face opposite to the side on which the first fluorescent substance layer 34 is provided.

Since the fluorescence light YL which is output from the first fluorescent substance layer 34 is non-polarized light in which the polarizing direction is not aligned, the yellow fluorescence light YL is input to the first polarization separation element 50A while maintaining the non-polarized state, after passing through the first pickup optical system 26. The fluorescence light YL penetrates the first polarization separation element 50A, and proceeds toward the integrator optical system 31.

On the other hand, the P-polarized blue light BLp which is output from the first polarization separation element 50A is input to the optical element 41. The optical element 41 includes the phase difference plate 28, the second pickup optical system 29, and the diffusive reflection element 30. Blue light BLp' is input to the phase difference plate 28. The phase difference plate 28 is configured of a quarter wave plate which is arranged on the optical path between the polarization separation element 50A and the diffusive reflection element 30. Accordingly, the P-polarized blue light BLp which is output from the polarization separation element 50A is converted into circularly polarized blue light BLc by the phase difference plate 28, and is input to the second pickup optical system 29.

The second pickup optical system 29 causes the blue light BLc to be condensed toward the diffusive reflection element 30. The second pickup optical system 29 is configured of a pickup lens 29a and a pickup lens 29b, for example.

The diffusive reflection element 30 causes the blue light BLc which is output from the second pickup optical system to be diffusively reflected toward the polarization separation element 50A. Specifically, it is preferable to use an element which causes the blue light BLc which has entered the diffusive reflection element 30 to be subjected to Lambertian reflection, as the diffusive reflection element 30. In the lighting device 2, it is possible to obtain the blue light BLc' which has uniform illuminance distribution while diffusively reflecting the blue light BLc using such a diffusive reflection element 30.

As illustrated in FIG. 2, the blue light BLc' which is diffusively reflected by the diffusive reflection element 30 is converted into S-polarized blue light BLs' from the circularly polarized blue light BLc' when being input to the phase difference plate 28 again. For this reason, S-polarized blue light BLs' is output from the optical element 41. The S-polarized blue light BLs' according to the embodiment corresponds to the fourth light flux in the appended claims. The S-polarized blue light BLs' is input to the polarization separation element 50A. The S-polarized blue light BLs' is reflected on the polarization separation element 50A, and proceeds toward the integrator optical system 31.

In this manner, the blue light BLs' is used as the illumination light WL along with the fluorescence light YL which penetrates the polarization separation element 50A. That is, the blue light BLs' and the fluorescence light YL are output in the same direction as each other from the polarization separation element 50A. In this manner, it is possible to obtain white illumination light WL in which the blue light BLs' and the yellow fluorescence light YL are combined. That is, the polarization separation element 50A also serves as a color combining element which combines the blue light BLs' and the yellow fluorescence light YL. The polarization separation element 50A according to the embodiment corresponds to the first color combining element in the appended claims.

The illumination light WL which was output from the polarization separation element 50A is input to the integrator optical system 31. The integrator optical system 31 divides the illumination light WL into a plurality of small light fluxes. The integrator optical system 31 is configured of a first lens array 31a and a second lens array 31b, for example. The first lens array 31a and the second lens array 31b are each formed of a plurality of micro lenses which is aligned in an array form.

The illumination light WL (a plurality of small light fluxes) which is output from the integrator optical system 31 is input to the polarizing conversion element 32. The polarizing conversion element 32 aligns a polarizing direction of the illumination light WL. The polarizing conversion element 32 is configured of a polarization separation film, a phase difference plate, and a mirror, for example. The polarizing conversion element 32 converts the other polarizing component into one polarizing component, for example, converts the P-polarized component into the S-polarized component, to align a polarizing direction of the fluorescence light YL which is non-polarized light with a polarizing direction of the S-polarized blue light BLs'.

The first light intensity monitoring mirror 42 is provided on the optical path between the integrator optical system 31 and the polarizing conversion element 32. The first light intensity monitoring mirror 42 is arranged so as to form an angle of 45° with respect to the optical axis ax2. The first light intensity monitoring mirror 42 transmits a part of input light beams, and reflects the rest. The light which penetrated the first light intensity monitoring mirror 42 is input to the polarizing conversion element 32, and the light which was reflected on the first light intensity monitoring mirror 42 is input to the first sensor unit 43. A detailed configuration of the first sensor unit 43 will be described later. The first sensor unit 43 according to the embodiment corresponds to the first detection unit in the appended claims.

Figure 5:
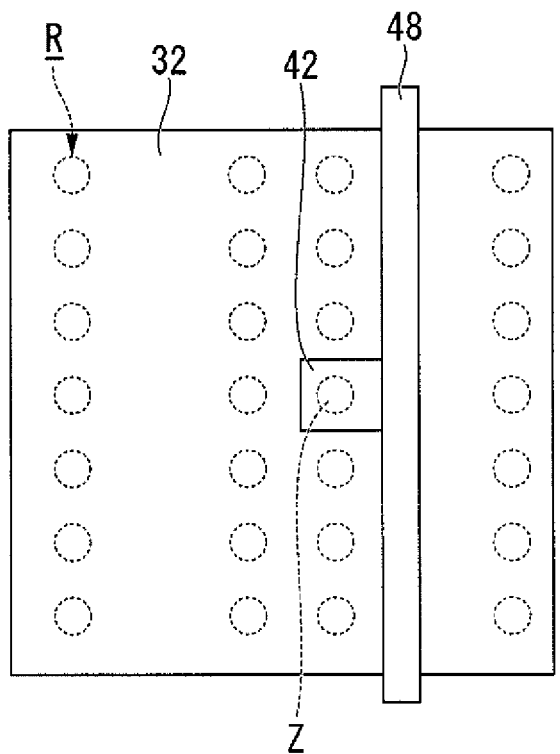
FIG. 5 is a front view which illustrates a mirror arrangement in a polarizing conversion element.

As illustrated in FIG. 5, the first light intensity monitoring mirror 42 is held by a holding member 48 which is arranged such that the holding member 48 avoids a light input region R of the polarizing conversion element 32. The light input region R of the polarizing conversion element 32 is a region to which a plurality of each of small light fluxes which are output from the integrator optical system 31 are input. The first light intensity monitoring mirror 42 is arranged at a position at which a secondary light source image Z of the blue light BL which is output from the semiconductor laser 211 is formed. Here, an example is illustrated, in which the first light intensity monitoring mirror 42 is arranged on an optical path between the integrator optical system 31 and the polarizing conversion element 32. Instead of this example, the first light intensity monitoring mirror 42 may be arranged on an optical path between the polarizing conversion element 32 and the superposition lens 33a.

The illumination light WL of which the polarizing direction is aligned by passing through the polarizing conversion element 32 is input to the superposition lens 33a. The superposition lens 33a overlaps the plurality of small light fluxes, which was output from the polarizing conversion element 32, with each other on an illumination target. In this manner, it is possible to uniformly illuminate the illumination target. The superposition optical system 33 is configured of the integrator optical system 31 which is configured of a first lens array 31a and a second lens array 31b, and the superposition lens 33a.

According to the embodiment, the first light intensity monitoring mirror 42 is arranged at a formation position of the secondary light source image Z on the optical path between the integrator optical system 31 and the polarizing conversion element 32. For this reason, even when apart of light beams is separated by arranging the first light intensity monitoring mirror 42 on the optical path, uneven illuminance does not occur in the red light optical modulation unit 4R, the green light optical modulation unit 4G, and the blue light optical modulation unit 4B which are to be illuminated. Accordingly, if an illumination decrease by the amount due to one secondary light source image is allowed, the first light intensity monitoring mirror 42 may not necessarily be a mirror which transmits a part of light, and reflects the rest, but may be a mirror which reflects all of light.

Hereinafter, the rotation mechanism of the first phase difference plate will be described.

Figure 3:
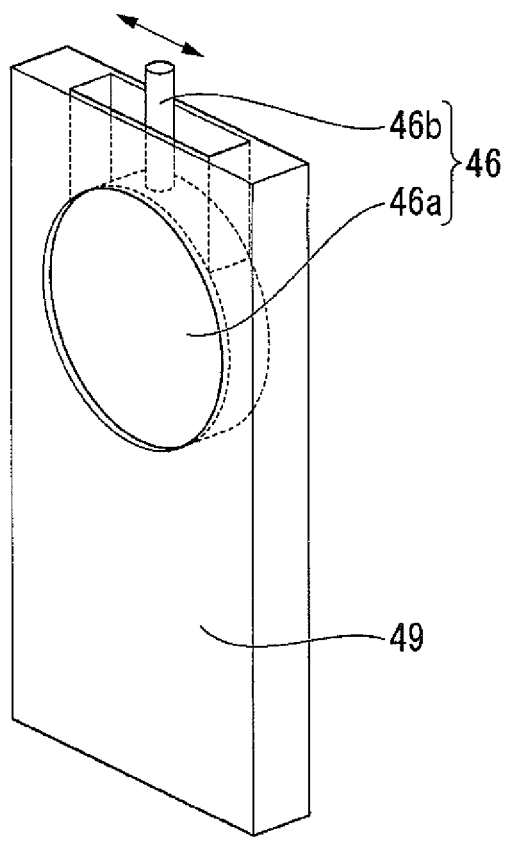
FIG. 3 is a perspective view which illustrates a phase difference plate and a rotation adjusting mechanism which are used in the lighting device.

As illustrated in FIG. 3, the first phase difference plate 46 is configured of a circular plate body 46a, and is provided with a rod unit 46b which protrudes to the outside from the plate body 46a. The first phase difference plate 46 is rotatably held by a holding member 49. The rod unit 46b of the first phase difference plate 46 protrudes to the outside of the holding member 49. The first phase difference plate 46 rotates when the rod unit 46b moves in a direction which extends along a main plane of the holding member 49.

Figure 4:
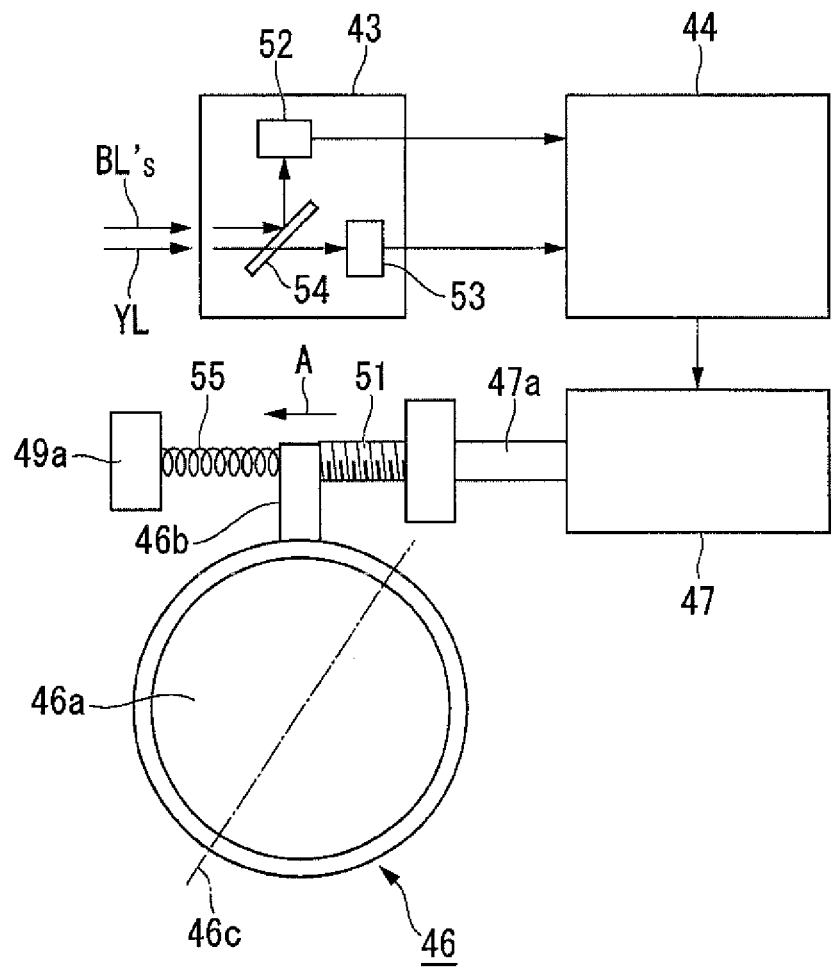
FIG. 4 is a schematic diagram which illustrates the phase difference plate, and a control unit thereof.

As illustrated in FIG. 4, a spring 55 is inserted into a space between the rod unit 46b of the first phase difference plate 46 and a wall portion 49a of the holding member 49. In addition, a screw member 51 is fixed to a tip end of a rotation axis 47a of the first motor 47. When the screw member 51 rotates due to a rotation of the first motor 47, the screw member 51 presses the rod unit 46b in a direction of an arrow A in FIG. 4, and the first phase difference plate 46 rotates counterclockwise. When a force of the screw member 51 pressing the rod unit 46b is released, the first phase difference plate 46 rotates clockwise due to the operation of the spring 55, and returns to a neutral position. An optical axis 46c of the first phase difference plate 46 rotates along with the rotation of the first phase difference plate 46.

The first sensor unit 43 includes a sensor for blue light 52 for detecting the intensity of the blue light BLs', a sensor for yellow light 53 for detecting the intensity of the yellow fluorescence light YL, and a dichroic mirror 54 which separates the blue light BLs' and the yellow fluorescence light YL from each other. The light which is taken out from the first light intensity monitoring mirror 42 is input to the first sensor unit 43, and is separated into the blue light BLs' and the yellow fluorescence light YL by the dichroic mirror 54. The intensity of the blue light BLs' is detected by the sensor for blue light 52. The intensity of the yellow fluorescence light YL is detected by the sensor for yellow light 53.

A detection result of the intensities of the blue light BLs' and the yellow fluorescence light YL from the first sensor unit 43 is output to the first control unit 44. The first control unit 44 changes a direction of the optical axis 46c of the first phase difference plate 46 by rotating the first phase difference plate 46 so that a ratio of the intensity of the blue light BLs' to the intensity of the yellow fluorescence light YL gets closer to a reference value. The reference value of the ratio of the intensity of the blue light BLs' to the intensity of the yellow fluorescence light YL may be a value which is determined based on the initial intensity of the blue light BLs' and the initial intensity of the yellow fluorescence light YL at a time of starting to use the projector 1. Here, the initial intensities of the blue light BLs' and the yellow fluorescence light YL are measured by the first sensor unit 43. Alternatively, a design value of the projector 1 may be used as the reference value of the ratio of the intensity of the blue light BLs' to the intensity of the yellow fluorescence light YL.

Next, a case in which an intensity of light which is output from the semiconductor laser 211 decreases due to a deterioration with time during use of the projector will be assumed. A countermeasure according to the embodiment with respect to a deviation in white balance which occurs in this case will be described based on a flowchart in FIG. 6.

When an output of the semiconductor laser 211 decreases (step S1 in FIG. 6), the light intensity of the excitation light BLs which excites the fluorescent substance layer 34 also decreases. Decreasing of the light intensity of the excitation light BLs is equal to decreasing of the optical density (light intensity per unit area) of the excitation light BLs (step S2 in FIG. 6). In general, the fluorescent substance has a property in which a conversion efficiency of converting the excitation light to fluorescence light increases, when the optical density of the excitation light decreases. Accordingly, even though the light intensity of the excitation light BLs decreases, the light intensity of the fluorescence light YL which is output from the fluorescent substance layer 34 increases (step S3 in FIG. 6) when an increased amount of the fluorescence light due to the increase in the conversion efficiency exceeds a decreased amount of the fluorescence light due to the decrease in light intensity of the excitation light BLs. Here, a case in which the light intensity of the fluorescence light YL increases is exemplified; however, there also is a case in which the light intensity of the fluorescence light YL decreases. However, the white balance is unbalanced in both cases.

Here, the light intensity of the blue light BLs' and the light intensity of the excitation light BLs also decrease along with the decrease in output of the semiconductor laser 211. However, since the conversion efficiency of the fluorescent substance increases, the light intensity of the fluorescence light YL with respect to the blue light BLs' relatively increases (step S4 in FIG. 6). As a result, the ratio of the blue light BLs' to the yellow fluorescence light YL changes, and the white balance of the white light, which is combined light of the blue light BLs' and the yellow fluorescence light YL, becomes unbalanced (step S5 in FIG. 6) compared with the white balance before the deterioration with time. Specifically, since the light intensity of the yellow fluorescence light YL with respect to the light intensity of the blue light BLs' relatively increases, the combined light changes to yellowish white light.

Figure 6:
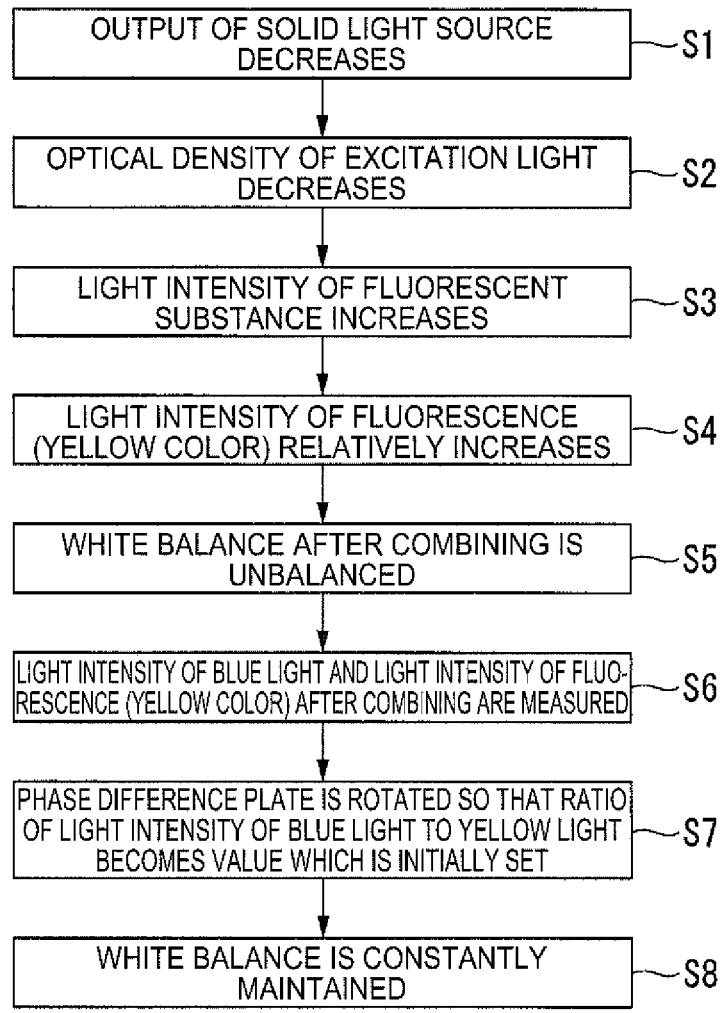
FIG. 6 is a flowchart which illustrates a way of adjusting a color balance.

Here, the light intensity of the blue light BLs' and the light intensity of the yellow fluorescence light YL which are included in the light which is taken out from the first light intensity monitoring mirror 42 are measured by the first sensor unit 43 (step S6 in FIG. 6). The reference value of the ratio of the light intensity of the blue light to the light intensity of the yellow light, which is determined based on the initial intensity value at a time of starting to use the projector 1, is stored in the first control unit 44 in advance. The first control unit 44 compares the ratio of the current intensity of the blue light to the current intensity of the yellow light which are detected by the first sensor unit 43 to the stored reference value. As a result, when a difference between the ratio of the current intensity of the blue light to the current intensity of the yellow light and the reference value of the ratio exceeds a permissible range, the first phase difference plate 46 is rotated so that the ratio of the current intensity of the blue light to the current intensity of the yellow light gets closer to the reference value (initial value) (step S7 in FIG. 6).

It is possible to adjust the ratio between the light intensity of the S-polarized component BLs and the light intensity of the P-polarized component BLp which are generated in the first phase difference plate 46 by rotating the first phase difference plate 46 by a predetermined angle. Specifically, in order to increase the light intensity of the P-polarized component BLp which will become the blue light while decreasing the light intensity of the P-polarized component BLp which will become the excitation light for generating the fluorescence light YL, the light intensity of the P-polarized component BLp may be relatively increased whereas the light intensity of the S-polarized component BLs may be relatively decreased. In this manner, since the light intensity of the P-polarized component BLp which will become the blue light which penetrates the first polarization separation element 50A relatively increases compared to the case in which the white balance of the white light is unbalanced, the combined light gets closer to a white color, and thus, it is possible to improve the white balance.

Explanation will be made referring to FIGS. 7A and 7B on the fact that, by rotating the first phase difference plate 46 by a predetermined angle, it is possible to adjust the ratio of the light intensity of the S-polarized component BLs to the light intensity of the P-polarized component BLp which are generated in the first phase difference plate 46.

Figure 7A:
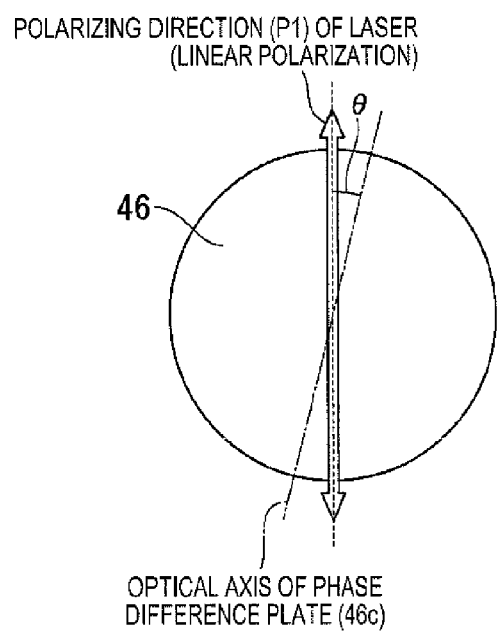
FIG. 7A is a diagram which illustrates a polarized state of light before passing through a first phase difference plate.
Figure 7B:
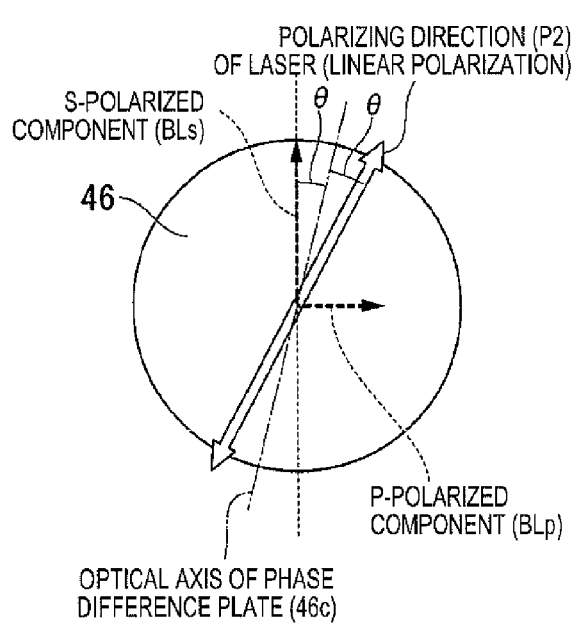
FIG. 7B is a diagram which illustrates a polarized state of light after passing through the first phase difference plate, respectively.

FIG. 7A is a diagram which illustrates a polarized state of light before passing through the first phase difference plate 46. FIG. 7B is a diagram which illustrates a polarized state of light after passing through the first phase difference plate 46.

According to the embodiment, the blue light BL before passing through the first phase difference plate 46 is the S-polarized light (linearly polarized light). As illustrated in FIG. 7A, the polarizing direction P1 of the S-polarized light intersects the optical axis 46c of the first phase difference plate 46 so as to form an angle of θ. The polarizing direction P1 of the blue light BL is rotated clockwise by an angle of 2θ after the blue light passes through the first phase difference plate 46, and becomes the polarizing direction P2, as illustrated in FIG. 7B. At this time, the S-polarized component BLs and the P-polarized component BLp are generated, and the ratio of the light intensity of the S-polarized component Ins to the light intensity of the P-polarized component BLp is cos(2θ):sin(2θ). When θ=2°, for example, the ratio of the light intensity of the S-polarized component BLs to the light intensity of the P-polarized component BLp is 14.3:1. Accordingly, in the arrangements in FIGS. 7A and 7B, it is possible to relatively increase the intensity of the P-polarized component BLp with respect to the S-polarized component BLs by enlarging the rotation angle θ.

The inventor performed an actual measurement of a color temperature of illumination light while changing a rotation angle of the first phase difference plate 46, and verified whether or not a color of the illumination light changed at the time of changing the rotation angle of the first phase difference plate 46.

Figure 8:
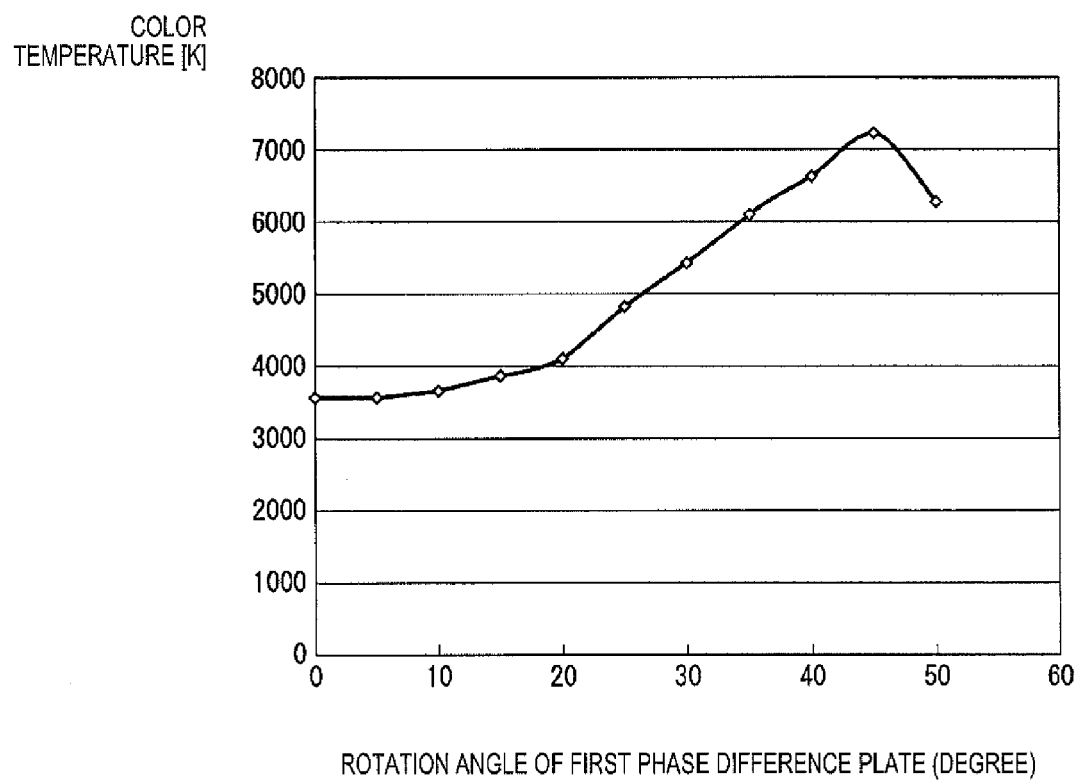
FIG. 8 is a graph which illustrates a relationship between a rotation angle of the first phase difference plate and a color temperature.

FIG. 8 is a graph which illustrates a relationship between a rotation angle of the first phase difference plate and a color temperature of illumination light. The horizontal axis denotes a rotation angle (degrees) of the first phase difference plate 46, and the vertical axis denotes a color temperature [K] of the illumination light. As illustrated in FIG. 8, there is a trend that, when the rotation angle of the first phase difference plate 46 increases from 0° to 45°, for example, the color temperature of the illumination light increases from approximately 3500 K to approximately 7200 K. In this manner, it was verified that it is possible to adjust a color temperature of illumination light, that is, a color of the illumination light by changing a rotation angle of the first phase difference plate 46.

As described above, according to the lighting device 2 in the embodiment, since the rotation angle of the first phase difference plate 46 is controlled based on the light intensity of the blue light and the light intensity of the yellow light which are detected by the first sensor unit 43, it is possible to adjust the white balance by correcting a deviation of the white balance which is caused by a deterioration with time of the semiconductor laser 211 and other optical components.

Specifically, since a detection is performed by taking out a part of the secondary light source images using the first light intensity monitoring mirror 42, it is possible to perform adjusting of the white balance with good accuracy without causing uneven illuminance in the red light optical modulation unit 4R, the green light optical modulation unit 4G, and the blue light optical modulation unit 4B. According to the embodiment, because the projector 1 includes such a lighting device 2, it is possible to provide the projector 1 in which white balance of an image is excellent, and which has a high display quality.

As a timing for adjusting the white balance, it is preferable to set monitoring of the intensity of the blue light and the intensity of the yellow light, and the rotating operation of the first phase difference plate 46 to be immediately after turning on of a main power supply of the projector 1, for example. The reason for this is that if the adjustment is performed immediately after the turning on of the main power supply of the projector 1, it is difficult for a user to recognize a change in hue of an image. However, if adjusting of the white balance is performed only immediately after the turning on of the main power supply of the projector 1, it is not possible to cope with a case in which the white balance is unbalanced during the operation of the projector 1. Accordingly, a configuration may be adopted in which adjusting of the white balance is performed at a predetermined time interval even during the operation of the projector 1.

Second Embodiment

Hereinafter, a second embodiment of the invention will be described using FIG. 9.

A basic configuration of a lighting device according to the second embodiment is the same as that in the first embodiment, and a difference from the first embodiment is that a fluorescent substance layer which emits green light, and a fluorescent substance layer which emits red light are used instead of the fluorescent substance layer which emits yellow light.

Figure 9:
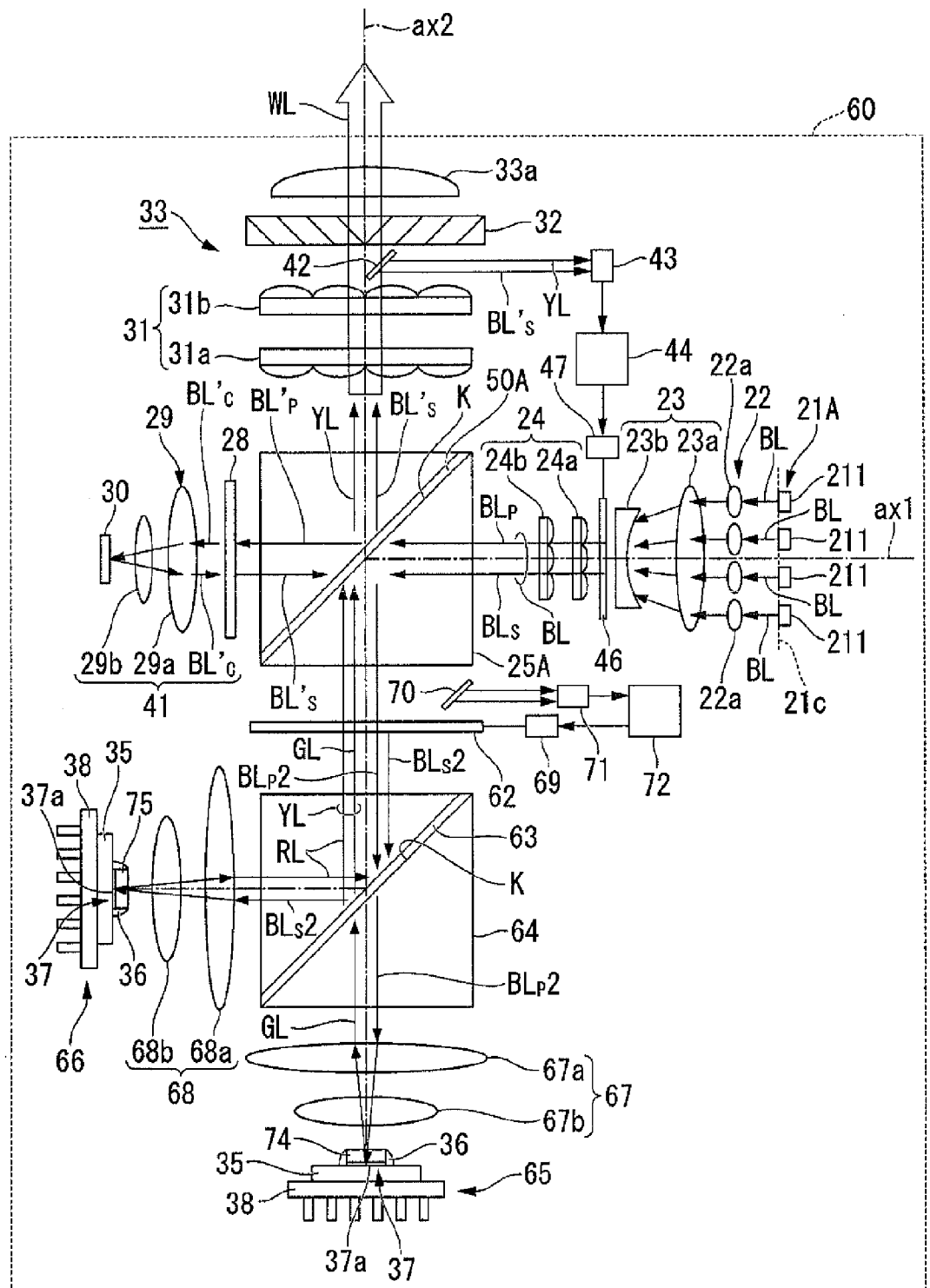
FIG. 9 is a schematic configuration diagram which illustrates a lighting device according to a second embodiment of the invention.

FIG. 9 is a schematic configuration diagram of a lighting device according to the second embodiment.

In FIG. 9, common constituent elements in FIG. 2 which are used in the first embodiment are given the same reference numerals, and descriptions thereof will be omitted.

In the lighting device according to the first embodiment, the wavelength conversion unit is configured of the light emitting element 27. As illustrated in FIG. 9, in a lighting device 60 according to the embodiment, the wavelength conversion unit includes a second phase difference plate 62, a second prism 64 including a second polarization separation element 63, a second light emitting element 65, a third light emitting element 66, a third pickup optical system 67, and a fourth pickup optical system 68.

The second phase difference plate 62 is provided on an optical path between the first prism 25A and the second prism 64. The second phase difference plate 62 is provided so as to be rotatable in a plane of a main plane to which light is input. The second phase difference plate 62 is configured of a half-wave plate with respect to the wavelength 466 nm of blue light. An optical axis of the second phase difference plate 62 intersects the polarizing axis of the blue light BLs which is output from the first prism 25A. The optical axis of the second phase difference plate 62 may be either a fast axis or a slow axis of the second phase difference plate 62.

Since the polarizing axis of the blue light BLs which is output from the first prism 25A intersects the optical axis of the second phase difference plate 62, a part of the S-polarized light BLs is converted into P-polarized light BLp2 after the blue light BLs penetrated the second phase difference plate 62. As a result, the blue light BLs which penetrated the second phase difference plate 62 becomes light in which the S-polarized component BLs2 and the P-polarized component BLp2 are mixed in a predetermined ratio.

A second motor 69 for rotating the second phase difference plate 62 is connected to the second phase difference plate 62. Since a supporting structure or a rotating mechanism of the second phase difference plate 62 is the same as that in the first phase difference plate, descriptions thereof will be omitted.

The S-polarized component BLs2 and the P-polarized component BLp2 are input to the second prism 64. The second prism 64 is configured of a dichroic prism which has wavelength selectivity, for example. A parallel plate-shaped dichroic mirror may be used instead of the second prism 64 which is configured of the dichroic prism.

The second polarization separation element 63 with wavelength selectivity is provided on an inclined plane K of the dichroic prism. The second polarization separation element 63 transmits the P-polarized component BLp2, and reflects the S-polarized component BLs2. Hereinafter, since the S-polarized component which is reflected on the second polarization separation element 63 is used in excitation of a red color fluorescent substance layer which will be described later, the S-polarized component is referred to as a red color excitation light BLs2. Since the P-polarized component which penetrates the second polarization separation element 63 is used in excitation of a green color fluorescent substance layer which will be described later, the P-polarized component is referred to as a green color excitation light BLp2. According to the embodiment, the green color fluorescent substance layer and the red color fluorescent substance layer correspond to the first fluorescent substance layer and the second fluorescent substance layer in the appended claims, respectively.

In addition, the second polarization separation element 63 has a color separation function of reflecting red fluorescence light RL in a wavelength range different from the blue light BL, regardless of a polarization state of the red fluorescence light RL, and transmitting green fluorescence light GL in a wavelength range different from the blue light BL, regardless of a polarization state of the green fluorescence light GL.

The green color excitation light BLp2 which is output from the second polarization separation element 63 is input to the third pickup optical system 67. The third pickup optical system 67 causes the green color excitation light BLp2 to be condensed toward a green color fluorescent substance layer 74 of the second light emitting element 65. The third pickup optical system 67 is configured of a pickup lens 67a, and a pickup lens 67b, for example.

The green color excitation light BLp2 which is output from the third pickup optical system 67 is input to the second light emitting element 65. The second light emitting element 65 includes the green color fluorescent substance layer 74, a substrate 35 which supports the green color fluorescent substance layer 74, and a heat sink 38. When the green color excitation light BLp2 is input to the green color fluorescent substance layer 74, a fluorescent substance included in the green color fluorescent substance layer 74 is excited, and green fluorescence light GL of which a wavelength is different from that of the green color excitation light BLp2 is generated. The fluorescence light GL according to the embodiment corresponds to the fifth light flux in the third wavelength range in the appended claims.

The fluorescence light GL coming from the green color fluorescent substance layer 74 passes through the third pickup optical system 67, and then penetrates the second polarization separation element 63 regardless of the polarization state thereof.

On the other hand, the red color excitation light BLs2 coming from the second polarization separation element 63 is input to the fourth pickup optical system 68. The fourth pickup optical system 68 causes the red color excitation light BLs2 to be condensed toward the red color fluorescent substance layer 75 of the third light emitting element 66. The fourth pickup optical system 68 is configured of a pickup lens 68a and a pickup lens 68b, for example.

The red color excitation light BLs2 coming from the fourth pickup optical system 68 is input to the third light emitting element 66. The third light emitting element 66 includes the red color fluorescent substance layer 75, the substrate 35 which supports the red color fluorescent substance layer 75, and the heat sink 38. When the red color excitation light BLs2 is input to the red color fluorescent substance layer 75, a fluorescent substance included in the red color fluorescent substance layer 75 is excited, and red fluorescence light RL of which a wavelength is different from that of the red color excitation light BLs2 is generated. The red fluorescence light RL according to the embodiment corresponds to the sixth light flux in the fourth wavelength range in the appended claims.

The red fluorescence light RL coming from the red color fluorescent substance layer 75 passes through the fourth pickup optical system 68, and then is reflected on the second polarization separation element 63. Accordingly, yellow fluorescence light YL is generated when the green fluorescence light GL which penetrated the second polarization separation element 63, and the red fluorescence light RL which was reflected on the second polarization separation element 63 are combined, and the yellow fluorescence light YL is output from the second polarization separation element 63. That is, the second polarization separation element 63 functions as a color combining element which combines the green fluorescence light GL and the red fluorescence light RL. The yellow fluorescence light YL which is combined by the second polarization separation element 63 penetrates the second phase difference plate 62. The second polarization separation element 63 according to the embodiment corresponds to a second color combining element in the appended claims.

A second light intensity monitoring mirror 70 is arranged on an optical path between the second phase difference plate 62 and the first prism 25A. The green fluorescence light GL and the red fluorescence light RL are Lambert scattered light which are emitted from the respective fluorescent substance layers. For this reason, each of the green fluorescence light GL and the red fluorescence light RL has an illuminance distribution which is high at a center portion which is close to an optical axis, and is low at the peripheral portion. Accordingly, it is preferable to arrange the second light intensity monitoring mirror 70 at a position corresponding to the peripheral portion of the second phase difference plate 62.

A second sensor unit 71, though detailed configuration thereof is not illustrated, includes a sensor for green light for detecting the light intensity of the green fluorescence light GL, a sensor for red light for detecting the light intensity of the red fluorescence light RL, and a dichroic mirror which separates the green fluorescence light and the red fluorescence light from each other. The light which was taken out from the second light intensity monitoring mirror 70 is input to the second sensor unit 71, and then is separated into the green fluorescence light and the red fluorescence light by the dichroic mirror. The intensity of the green fluorescence light GL is detected by the sensor for green light. The intensity of the red fluorescence light RL is detected by the sensor for red light.

A detection result of the intensity of the green fluorescence light and the intensity of the red fluorescence light from the second sensor unit 71 is output to the second control unit 72. The second control unit 72 rotates the second phase difference plate 62 in order to change the direction of the optical axis of the second phase difference plate 62 so that the ratio of the intensity of the green fluorescence light GL to the intensity of the red fluorescence light RL gets closer to a reference value. The reference value of the ratio of the intensity of the green fluorescence light GL to the intensity of the red fluorescence light RL may be a value which is determined based on the initial intensity of the green fluorescence light GL and the initial intensity of the red fluorescence light RL at a time of starting to use the projector. Here, the initial intensities of the green fluorescence light GL and the red fluorescence light RL are measured by the second sensor unit 71. Alternatively, as the reference value of the ratio of the intensity of the green fluorescence light GL to the intensity of the red fluorescence light RL, a design value of the projector may be used. In the example, the first control unit 44 and the second control unit 72 are separately described in order to distinguish functions thereof; however, the first control unit 44 and the second control unit 72 may not necessarily be control units separated each other, and may be configured as one control unit.

Similarly to the first phase difference plate 46, it is possible to adjust the ratio of the light intensity of the S-polarized component BLs2 to the light intensity of the P-polarized component BLp2 which are generated in the second phase difference plate 62 by rotating the second phase difference plate 62 by a predetermined angle. For example, it is possible to relatively decrease the light intensity of the red fluorescence light RL while relatively increase the light intensity of the green fluorescence light GL, by relatively increasing the light intensity of the P-polarized component BLp2 whereas relatively decreasing the light intensity of the S-polarized component BLs2. In contrast to this, it is possible to relatively increase the light intensity of the red fluorescence light RL while relatively decrease the light intensity of the green fluorescence light GL, by relatively decreasing the light intensity of the P-polarized component BLp2 whereas relatively increasing the light intensity of the S-polarized component BLs2. In this manner, it is possible to adjust a color balance of yellow light which is combined light of the red fluorescence light and the green fluorescence light.

In the lighting device 60 according to the embodiment, it is possible to adjust a color balance of white light which is combined light of blue light and yellow light by controlling a rotation angle of the first phase difference plate 46 after adjusting a color balance of yellow fluorescence light YL which is combined light of the red fluorescence light RL and the green fluorescence light GL, by controlling the rotation angle of the second phase difference plate 62.

As in the embodiment, when the green color fluorescent substance layer 74 and the red color fluorescent substance layer 75 are used, in general, a rate of change of conversion efficiency of a fluorescent substance with respect to a change in optical density of excitation light is different in the green fluorescent substance layer and the red color fluorescent substance layer. For this reason, it is effective to adopt the configuration of the embodiment in which the color balance of the white light is adjusted after adjusting the color balance of the yellow fluorescence light YL in advance, by controlling the rotation angle of the second phase difference plate 62. Also in the embodiment, because the projector includes such a lighting device 60, it is possible to provide a projector in which white balance of an image is excellent, and which has a high display quality.

Third Embodiment

Hereinafter, a third embodiment of the invention will be described using FIG. 10.

A basic configuration of a lighting device according to the third embodiment is the same as those in the first and second embodiments, a difference from those in the first and second embodiments being that a semiconductor laser for excitation light and a semiconductor laser for illumination light are separately included.

Figure 10:
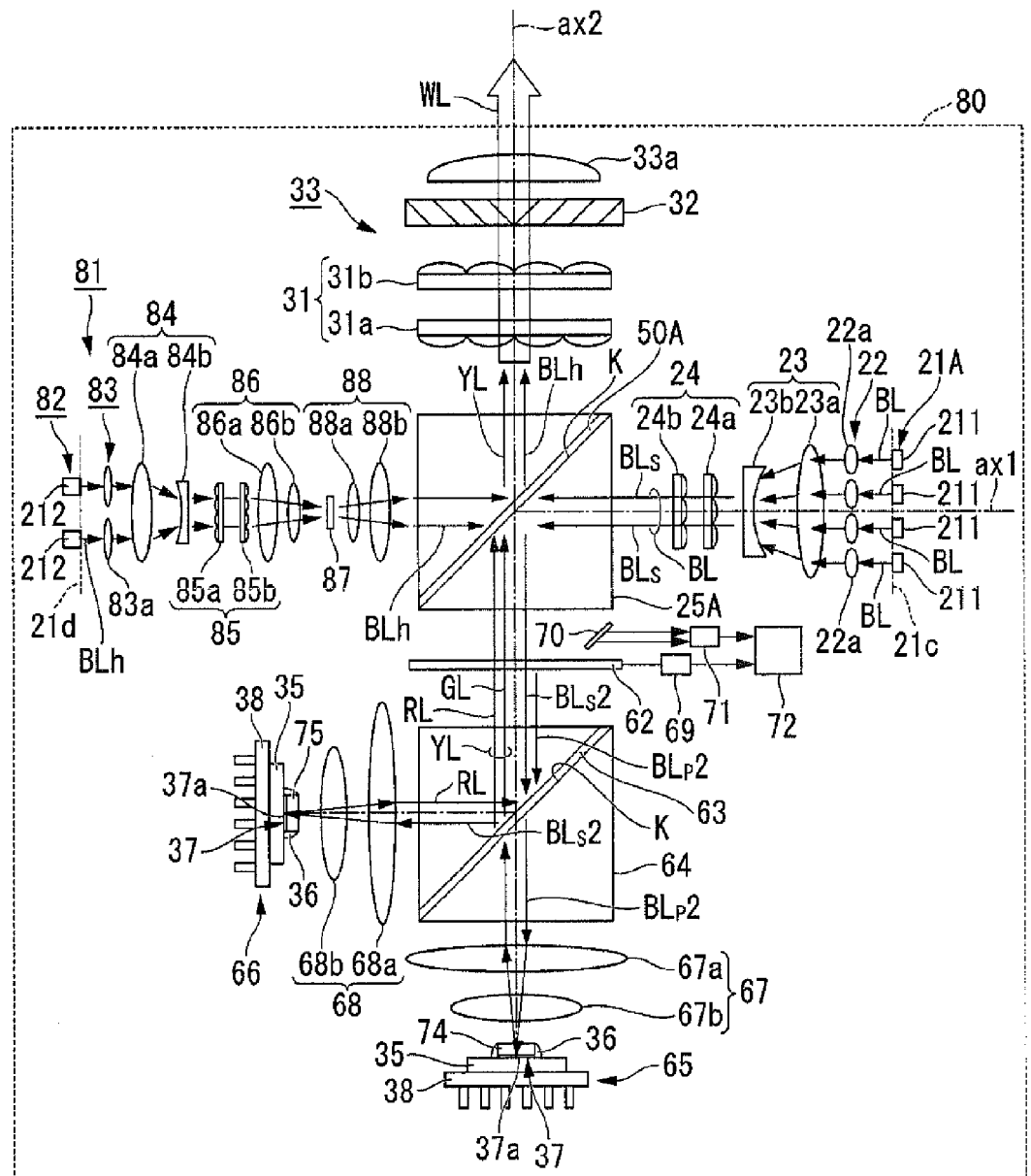
FIG. 10 is a schematic configuration diagram which illustrates a lighting device according to a third embodiment of the invention.

FIG. 10 is a schematic configuration diagram of the lighting device according to the third embodiment.

In FIG. 10, common constituent elements in FIG. 2 which are used in the first embodiment, and in FIG. 9 which are used in the second embodiment are given the same reference numerals, and descriptions thereof will be omitted.

As illustrated in FIG. 10, in a lighting device 80 according to the third embodiment, a configuration related to an optical path of the blue light BL configured of S-polarized light which is reflected on the first polarization separation element 50A, that is, a configuration on the lower side of the second phase difference plate 62 in FIG. 10 is the same as that of the lighting device 60 in the second embodiment. However, the first phase difference plate 46, the first motor 47, the first light intensity monitoring mirror 42, the first sensor unit 43, and the first control unit 44 which are provided in the lighting device 60 according to the second embodiment are not provided in the lighting device 80.

According to the embodiment, whole of blue light BL which is output from the semiconductor laser 211 is input to the first polarization separation element 50A as S-polarized light. The blue light BL which has entered the first polarization separation element 50A is reflected on the first polarization separation element 50A to be used as excitation light for exciting the green color fluorescent substance layer 74 or the red color fluorescent substance layer 75.

A blue light light source unit 81 is provided on the side opposite to the semiconductor laser 211 side in such a manner that the first prism 25A is disposed between the blue light light source unit 81 and the semiconductor laser 211. The blue light light source unit 81 is a unit for outputting blue light BLh which is used as illumination light. The blue light light source unit 81 includes an array light source 82, a collimator optical system 83, an afocal optical system 84, a homogenizer optical system 85, a fifth pickup optical system 86, a light diffusion element 87, and a sixth pickup optical system 88.

The array light source 82 includes a plurality of semiconductor lasers 212. The plurality of semiconductor lasers 212 are arranged in an array form in a plane 21d which is orthogonal to an optical axis ax1. The number of semiconductor lasers 212 is not particularly limited. The semiconductor laser 212 outputs P-polarized blue light of which a peak wavelength is 460 nm, for example. The P-polarized blue light BLh is output from the array light source 82 toward the collimator optical system 83.

The blue light BLh coming from the array light source 82 is input to the collimator optical system 83. The collimator optical system 83 converts the blue light BLh coming from the array light source 82 into a parallel light flux. The collimator optical system 83 is configured of a plurality of collimator lenses 83a which are arranged in an array form, for example. The plurality of collimator lenses 83a are arranged corresponding to the plurality of semiconductor lasers 212, respectively.

The blue light BLh which was converted into a parallel light flux by penetrating the collimator optical system 83 is input to the afocal optical system 84. The afocal optical system 84 adjusts a diameter of light flux of the blue light BLh. The afocal optical system 84 is configured of an afocal lens 84a and an afocal lens 84b, for example.

The blue light BLh of which the diameter of the light flux was adjusted by penetrating the afocal optical system 84 is input to the homogenizer optical system 85. The homogenizer optical system 85 converts a light intensity distribution of the blue light BLh into a uniform light intensity distribution which is referred to as top hat type distribution, for example. The homogenizer optical system 85 is configured of a multi lens array 85a and a multi lens array 85b, for example.

The blue light BLh which was output from the homogenizer optical system 85 is input to the fifth pickup optical system 86. The fifth pickup optical system 86 causes the blue light BLh to be condensed toward the light diffusion element 87. The fifth pickup optical system 86 is configured of a pickup lens 86a and a pickup lens 86b.

The light diffusion element 87 causes the blue light BLh which was output from the fifth pickup optical system 86 to be diffused while transmitting the blue light. It is possible to obtain blue light BLh with uniform illuminance distribution by diffusing the blue light BLh using the light diffusion element 87.

The blue light BLh which is output from the light diffusion element 87 is input to the first prism 25A through a sixth pickup optical system 88. The sixth pickup optical system 88 is configured of a pickup lens 88a and a pickup lens 88b. Since the blue light BLh is P-polarized light, the blue light is reflected on the first polarization separation element 50A of the first prism 25A. In this manner, the first polarization separation element 50A generates white light WL by combining the blue light BLh which was reflected on the first polarization separation element 50A and the yellow fluorescence light YL which penetrated the first polarization separation element 50A Configurations other than these are the same as those in the lighting device 60 according to the second embodiment.

In the lighting device 80 according to the embodiment, similarly to the lighting device 60 according to the second embodiment, it is possible to adjust a color balance of the yellow fluorescence light YL which is combined light of the red fluorescence light RL and the green fluorescence light GL by controlling the rotation angle of the second phase difference plate 62. On the other hand, a color balance of the white light WL is adjusted by controlling an output of the blue light BLh, which is output from the semiconductor laser 212 of the blue light light source unit 81, according to a light intensity of the yellow fluorescence light YL which penetrated the first polarization separation element 50A. For this reason, a sensor for detecting the light intensity of the yellow fluorescence light YL which penetrated the first polarization separation element 50A may be provided.

It is possible to obtain the same effects as those in the first and second embodiments, in which it is possible to effectively adjust the color balance of the white light also in the lighting device 80 according to the embodiment. In addition, because the projector includes the lighting device 80, it is possible to provide a projector in which white balance of an image is excellent, and which has a high display quality.

In addition, according to the embodiment, names of common optical components with respect to those in the second embodiment have been described without being changed for ease of understanding of the configuration of the lighting device 80 comparing to the lighting device 60 according to the second embodiment. However, according to the embodiment, even though the names of optical components are common, correspondence with constituent elements in the appended claims is different from that in the second embodiment. For example, according to the embodiment, the P-polarized component BLp2 and the S-polarized component BLs2 which are output from the second prism 64 correspond to the first light flux and the second light flux, respectively. The second phase difference plate 62 according to the embodiment corresponds to the first phase difference plate in the appended claims. The second polarization separation element 63 according to the embodiment corresponds to the first polarization separation element in the appended claims. The second light emitting element 65 corresponds to the wavelength conversion unit in the appended claims. The green color fluorescent substance layer 74 according to the embodiment corresponds to the first fluorescent substance layer in the appended claims. The third light emitting element 66 according to the embodiment corresponds to the optical element in the appended claims. The second polarization separation element 63 according to the embodiment corresponds to the first color combining element in the appended claims. The second sensor unit 71 according to the embodiment corresponds to the first detection unit in the appended claims. The second control unit 72 according to the embodiment corresponds to the first control unit in the appended claims.

In addition, the technical range of the invention is not limited to the embodiments, and various modifications can be added without departing from the scope of the invention.

For example, in the embodiment, the example in which the rotation angle of the first phase difference plate or the second phase difference plate is adjusted in order to adjust the white balance of illumination light has been described; however, the rotation angle of the first phase difference plate or the second phase difference plate may be adjusted in order to intentionally change a hue of the illumination light. For example, in a case of white light, the rotation angle of the first phase difference plate or the second phase difference plate may be adjusted in order to intentionally generate bluish white light, or yellowish white light.

The first phase difference plate 46 is configured of a half-wave plate with respect to the wavelength of 446 nm of blue light BL; however, there is no limitation to this. The phase difference plate may be a transparent optical element which can change a polarization state by a rotation thereof, and may be a quarter-wave plate, for example.

In addition, in the embodiment, a projector which includes three optical modulation units has been exemplified; however, it is also possible to apply the embodiment to a projector which displays a color picture (image) using one optical modulation unit. In addition, it is possible to appropriately change the number, a size, an arrangement, or the like, of various constituent elements of the light emitting element, the lighting device, and the projector.

The entire disclosure of Japanese Patent Application No. 2013-249458, filed on Dec. 2, 2013 is expressly incorporated by reference herein.

What is claimed is:

1. A lighting device comprising:
   a light emitting element which outputs light in a first wavelength range;

a first phase difference plate to which the light output from the light emitting element is input;

a first polarization separation element which separates the light from the first phase difference plate into a first light flux in a first polarization state, and a second light flux in a second polarization state;

a wavelength conversion unit which includes a first fluorescent substance layer which is excited by the light in the first wavelength range, and converts the first light flux into a third light flux in a second wavelength range which is different from the first wavelength range;

an optical element which converts the second light flux into a fourth light flux;

a first color combining element which combines the third light flux with the fourth light flux;

a first detection unit which detects an intensity of the third light flux and an intensity of the fourth light flux; and a first control unit which changes a direction of an optical axis of the first phase difference plate according to a detection result which is obtained by the first detection unit.

2. The lighting device according to claim 1, wherein the first control unit changes the direction of the optical axis of the first phase difference plate so that a ratio of the intensity of the third light flux to the intensity of the fourth light flux gets closer to a reference value.

3. The lighting device according to claim 2, wherein the reference value is determined based on an initial intensity of the third light flux and an initial intensity of the fourth light flux which are measured by the first detection unit.

4. The lighting device according to claim 1, further comprising:

a superposition optical system which includes a first lens array, a second lens array, and a superposition lens; and a mirror which is arranged on an optical path of light flux which is output from one lens among a plurality of lenses provided in the second lens array, and between the second lens array and the superposition lens, wherein light reflected by the mirror is input to the first detection unit.

5. The lighting device according to claim 4, wherein the mirror is arranged at a position at which a secondary light source image of the light which is output from the light emitting unit is formed.

6. The lighting device according to claim 1, wherein the first fluorescent substance layer outputs a fifth light flux in a third wavelength range which is different from both of the first wavelength range and the second wavelength range, and wherein the wavelength conversion unit includes a second fluorescent substance layer which is excited by the light in the first wavelength range, and outputs sixth light flux in a fourth wavelength range which is different from any of the first to third wavelength ranges;

a second phase difference plate to which the first light flux is input;

a second polarization separation element which separates light which is output from the second phase difference plate into a polarized component which is input to the first fluorescent substance layer, and a polarized component which is input to the second fluorescent substance layer;

a second color combining element which generates the third light flux by combining the fifth light flux and the sixth light flux;

a second detection unit which detects an intensity of the fifth light flux and an intensity of the sixth light flux; and a second control unit which changes a direction of an optical axis of the second phase difference plate according to a detection result which is obtained by the second detection unit.

7. A projector comprising:

the lighting device according to claim 1;

an optical modulation unit which modulates light according to image information, the light being output from the lighting device; and a projection optical system which projects the light modulated by the optical modulation unit.

8. A projector comprising:

the lighting device according to claim 2;

an optical modulation unit which modulates light according to image information, the light being output from the lighting device; and a projection optical system which projects the light modulated by the optical modulation unit.

9. A projector comprising:

the lighting device according to claim 3;

an optical modulation unit which modulates light according to image information, the light being output from the lighting device; and a projection optical system which projects the light modulated by the optical modulation unit.

10. A projector comprising:

the lighting device according to claim 4;

an optical modulation unit which modulates light according to image information, the light being output from the lighting device; and a projection optical system which projects the light modulated by the optical modulation unit.

11. A projector comprising:

the lighting device according to claim 5;

an optical modulation unit which modulates light according to image information, the light being output from the lighting device; and a projection optical system which projects the light modulated by the optical modulation unit.

12. A projector comprising:

the lighting device according to claim 6;

an optical modulation unit which modulates light according to image information, the light being output from the lighting device; and a projection optical system which projects the light modulated by the optical modulation unit.

* * * * *